US00RE42726E

(19) United States
(12) Reissued Patent
Keshav et al.

(10) Patent Number: US RE42,726 E
(45) Date of Reissued Patent: Sep. 20, 2011

(54) DYNAMICALLY MODIFYING THE RESOURCES OF A VIRTUAL SERVER

(75) Inventors: Srinivasan Keshav, Mountain View, CA (US); Rosen Sharma, Mountain View, CA (US); Shaw Chuang, Atherton, CA (US)

(73) Assignee: Digital Asset Enterprises, L.L.C., Wilmington, DE (US)

(21) Appl. No.: 11/971,778

(22) Filed: Jan. 9, 2008 (Under 37 CFR 1.47)

Related U.S. Patent Documents

Reissue of:
(64) Patent No.: 6,985,937
Issued: Jan. 10, 2006
Appl. No.: 09/569,371
Filed: May 11, 2000

(51) Int. Cl.
*G06F 15/173* (2006.01)
*G06F 11/00* (2006.01)
*G06F 9/46* (2006.01)

(52) U.S. Cl. ..... 709/223; 709/224; 709/226; 709/238; 370/235; 370/231; 718/105; 714/35

(58) Field of Classification Search ..... None
See application file for complete search history.

(56) References Cited

U.S. PATENT DOCUMENTS

| | | | |
|---|---|---|---|
| 3,377,624 | A | 4/1968 | Nelson et al. |
| 4,177,510 | A | 12/1979 | Appell et al. |
| 5,189,667 | A | 2/1993 | Esaki et al. |
| 5,212,793 | A | 5/1993 | Donica et al. |
| 5,226,160 | A | 7/1993 | Waldron et al. |
| 5,249,290 | A | 9/1993 | Heizer |
| 5,263,147 | A | 11/1993 | Francisco et al. |
| 5,325,530 | A | 6/1994 | Mohrmann |
| 5,437,032 | A | 7/1995 | Wolf et al. |
| 5,528,753 | A | 6/1996 | Fortin |
| 5,572,680 | A | 11/1996 | Ikeda et al. |
| 5,584,023 | A | 12/1996 | Hsu |
| 5,603,020 | A | 2/1997 | Hashimoto et al. |

(Continued)

FOREIGN PATENT DOCUMENTS

JP 64-002145 * 1/1989

(Continued)

OTHER PUBLICATIONS

Plummer, D. C., An Ethernet Address Resolution Protocol-or-Converting Network Protocol Addresses to 48.bit Ethernet Address for Transmission on Ethernet Hardware, Nov. 1982, [online], [retrieved on Jan. 17, 2000]. Retrieved from the Internet: <URL: msg.net/kadow/answers/extras/rfc/rfc826.txt>.

(Continued)

*Primary Examiner* — Wen-Tai Lin
(74) *Attorney, Agent, or Firm* — Perkins Coie LLP

(57) ABSTRACT

A system and a method dynamically adjusts the quality of service guarantees for virtual servers based upon the resource demands experienced by the virtual servers. Virtual server resource denials are monitored to determine if a virtual server is overloaded based upon the resource denials. Virtual server resources are modified dynamically to respond to the changing resource requirements of each virtual server. Occasionally, a physical host housing a virtual server may not have additional resources to allocate to a virtual server requiring increased resources. In this instance, a virtual server hosted by the overloaded physical host is transferred to another physical host with sufficient resources.

25 Claims, 7 Drawing Sheets

U.S. PATENT DOCUMENTS 5,623,492 A 4/1997 Teraslinna
5,636,371 A 6/1997 Yu
5,640,595 A 6/1997 Baugher et al.
5,692,047 A 11/1997 McManis
5,706,097 A 1/1998 Schelling et al.
5,706,453 A 1/1998 Cheng et al.
5,708,774 A 1/1998 Boden
5,719,854 A 2/1998 Choudhury et al.
5,727,203 A 3/1998 Hapner et al.
5,748,614 A 5/1998 Wallmeier
5,752,003 A 5/1998 Hart
5,761,477 A 6/1998 Wahbe et al.
5,764,889 A 6/1998 Ault et al.
5,781,550 A 7/1998 Templin et al.
5,799,173 A 8/1998 Gossler et al.
5,809,527 A 9/1998 Cooper et al.
5,828,893 A 10/1998 Wied et al.
5,838,686 A 11/1998 Ozkan
5,838,916 A 11/1998 Domenikos et al.
5,842,002 A 11/1998 Schnurer et al.
5,845,129 A 12/1998 Wendorf et al.
5,850,399 A 12/1998 Ganmukhi et al.
5,860,004 A 1/1999 Fowlow et al.
5,864,683 A 1/1999 Boebert et al.
5,889,956 A 3/1999 Hauser et al.
5,889,996 A 3/1999 Adams
5,892,968 A 4/1999 Iwasaki et al.
5,905,730 A 5/1999 Yang et al.
5,905,859 A 5/1999 Holloway et al.
5,913,024 A 6/1999 Green et al.
5,915,085 A 6/1999 Koved
5,915,095 A 6/1999 Miskowiec
5,918,018 A 6/1999 Gooderum et al.
5,920,699 A 7/1999 Bare
5,933,603 A 8/1999 Vahalia et al.
5,937,159 A 8/1999 Meyers et al.
5,956,481 A 9/1999 Walsh et al.
5,961,583 A 10/1999 Van Fleet
5,978,373 A 11/1999 Hoff et al.
5,982,748 A 11/1999 Yin et al.
5,987,524 A 11/1999 Yoshida et al.
5,991,812 A 11/1999 Srinivasan
5,999,963 A 12/1999 Bruno et al.
6,016,318 A 1/2000 Tomoike
6,018,527 A 1/2000 Yin et al.
6,023,721 A 2/2000 Cummings
6,038,608 A 3/2000 Katsumata
6,038,609 A 3/2000 Geulen
6,047,325 A 4/2000 Jain et al.
6,055,617 A 4/2000 Kingsbury
6,061,349 A 5/2000 Coile et al.
6,065,118 A 5/2000 Bull et al.
6,075,791 A 6/2000 Chiussi et al.
6,075,938 A 6/2000 Bugnion et al.
6,078,929 A 6/2000 Rao
6,078,957 A 6/2000 Adelman et al.
6,086,623 A 7/2000 Broome et al.
6,092,178 A 7/2000 Jindal et al.
6,094,674 A 7/2000 Hattori et al.
6,101,543 A 8/2000 Alden et al.
6,108,701 A 8/2000 Davis et al.
6,108,759 A 8/2000 Orcutt et al.
6,122,673 A 9/2000 Basak et al.
6,154,776 A 11/2000 Martin
6,154,778 A 11/2000 Koistinen et al.
6,161,139 A 12/2000 Win et al.
6,167,520 A 12/2000 Touboul
6,172,981 B1 1/2001 Cox et al.
6,189,046 B1 2/2001 Moore et al.
6,192,389 B1 2/2001 Ault et al.
6,192,512 B1 2/2001 Chess
6,230,203 B1 5/2001 Koperda et al.
6,240,463 B1 5/2001 Benmohamed et al.
6,247,057 B1 6/2001 Barrera
6,259,699 B1 7/2001 Opalka et al.
6,266,678 B1 7/2001 McDevitt et al.
6,269,404 B1 7/2001 Hart et al.
6,279,039 B1 8/2001 Bhat et al.
6,279,040 B1 8/2001 Ma et al.
6,282,581 B1 8/2001 Moore et al.
6,282,703 B1 8/2001 Meth et al.
6,286,047 B1 9/2001 Ramanathan et al.
6,298,479 B1 10/2001 Chessin et al.
6,314,558 B1 11/2001 Angel et al.
6,327,622 B1 12/2001 Jindal et al.
6,336,138 B1 1/2002 Caswell et al.
6,351,775 B1 2/2002 Yu
6,353,616 B1 3/2002 Elwalid et al.
6,363,053 B1 3/2002 Schuster et al.
6,370,583 B1 4/2002 Fishler et al.
6,381,228 B1 4/2002 Prieto, Jr. et al.
6,385,638 B1 5/2002 Baker-Harvey
6,389,448 B1 5/2002 Primak et al.
6,393,484 B1 5/2002 Massarani
6,425,003 B1 7/2002 Herzog et al.
6,430,622 B1 8/2002 Aiken, Jr. et al.
6,434,631 B1 8/2002 Bruno et al.
6,434,742 B1 8/2002 Koepele, Jr.
6,438,134 B1 8/2002 Chow et al.
6,442,164 B1 8/2002 Wu
6,449,652 B1 9/2002 Blumenau et al.
6,457,008 B1 9/2002 Rhee et al.
6,463,459 B1 10/2002 Orr et al.
6,470,398 B1 10/2002 Zargham et al.
6,487,578 B2 11/2002 Ranganathan
6,487,663 B1 11/2002 Jaisimha et al.
6,490,670 B1 12/2002 Collins et al.
6,499,137 B1 12/2002 Hunt
6,529,950 B1 3/2003 Lumelsky et al.
6,529,985 B1 3/2003 Deianov et al.
6,542,167 B1 4/2003 Darlet et al.
6,553,413 B1 4/2003 Leighton et al.
6,560,613 B1 5/2003 Gylfason et al.
6,578,055 B1 6/2003 Hutchison et al.
6,578,068 B1 6/2003 Bowman-Amuah
6,580,721 B1 6/2003 Beshai
6,647,422 B2 11/2003 Wesinger, Jr. et al.
6,658,571 B1 12/2003 O'Brien et al.
6,691,312 B1 2/2004 Sen et al.
6,711,607 B1 3/2004 Goyal
6,725,456 B1 4/2004 Bruno et al.
6,754,716 B1 6/2004 Sharma et al.
6,760,775 B1 7/2004 Anerousis et al.
6,779,016 B1 8/2004 Aziz et al.
6,820,117 B1 11/2004 Johnson
6,948,003 B1 9/2005 Newman et al.
6,976,258 B1 12/2005 Goyal et al.
6,985,937 B1 1/2006 Keshav et al.
7,343,421 B1 3/2008 Goyal
2003/0061338 A1 3/2003 Stelliga

FOREIGN PATENT DOCUMENTS

JP 64002145 A 1/1989
WO WO 99/39261 8/1999
WO WO-9939261 A1 8/1999

OTHER PUBLICATIONS

Huang, X. W. et al., "The ENTRAPID Protocol Development Environment," Proceedings of IEEE Infocom'99, Mar. 1999, 9 pages.
Duffield, N.G., et al., "A Flexible Model for Resource Management in Virtual Private Networks," Computer Communication Review Conference, Computer Communication, ACM SIGCOMM '99 Conference, Cambridge, MA, Aug. 30, 1999-Sep. 3, 1999. pp. 95-108.
Campbell, A. T. and Keshav, S., "Quality of Service in Distributed Systems," Computer Communications 21, 1998, pp. 291-293.
Bach, M. J., The Design of the Unix.RTM. Operating System, New Delhi, Prentice-Hall of India, 1989, pp. v-x, 19-37.
McDougall, R., et al., Resource Management, Upper Saddle River, NJ, Prentice Hall, 1999, pp. iii-xix, 135-191.
Rijsinghani, A., RFC 1624, May 1994, [online], [retrieved Feb. 2, 2000]. Retrieved from the internet: <URL:faqs.org/rfcs/rfc1624.html>.
Mallory, T and Kullberg, A., RFC 1141, Jan. 1990 [online], [retrieved Feb. 2, 2000]. Retrieved from the internet: <URL:faqs.org/rfcs/rfc1141.html>.

Egevang, K. and Francis P., RFC 1631, May 1994 [online], [retrieved Feb. 2, 2000]. Retrieved from the Internet: <URL:faqs.org/rfcs/rfc1631.html>.
Keshav, S., An Engineering Approach to Computer Networking: ATM Networks, the Internet, and the Telephone Network, Reading, MA, Addison-Wesley, 1997, pp. vii-xi, 85-115, 209-355, 395-444.
Stevens, R. W., Unix Network Programming vol. 1 Networking APIs: Sockets and XTI, Upper Saddle River, NJ, Prentice Hall, 1998, pp. v-xiv, 29-53, 85-110, 727-760.
Tanenbaum, A. S. And Woodhull, A. S., Operating Systems: Design and Implementation, Upper Saddle River, NJ, Prentice Hall, 1997, pp. vii-xiv, 1-46, 401-454.
Rubini, A., Linux Device Drivers, Sebastopol, CA, O'Reilly & Associates, Inc., 1998, pp. v-x, 13-40.
Goyal, P., et al., "A Hierarchical CPU Scheduler for Multimedia Operating Systems," Proceedings of the Second Symposium on Operating Systems Design and Implementations (OSDE'96), Seattle, WA, Oct. 1996, 15 pages.
Laurie, B. and Laurie, P., Apache The Definitive Guide, Sebastopol, CA, O'Reilly & Associates, Inc., Feb. 1999, pp. v-viii, 43-74.
Aho, A. V. and Ullman J. D., Principles of Complier Design, Reading, MA, 1977, pp. vii-x, 359-362, 519-522.
Jonsoon, J., "Exploring the Importance of Preprocessing Operations in Real-Time Multiprocessor Scheduling," Proc. of the IEEE Real-Time Systems Symposium—Work-in-Progress session, San Francisco, CA, Dec. 4, 1997, pp. 31-34.
Rusling, D. A., Processes, [online], [retrieved on Dec. 7, 1999]. Retrieved from the Internet: <URL: cebaf.gov/.about.saw/linux/tlk-html/node44.html>.
Rusling, D. A., Linux Processes, [online], [retrieved on Dec. 7, 1999]. Retrieved from the Internet: <URL:cebaf.gov/.about.saw/linux/tlk-html/node45.html>.
Rusling, D. A., Identifiers, [online], [retrieved on Dec. 7, 1999]. Retrieved from the Internet: <URL:cebaf.gov/.about.saw/linux/tlk-html/node46.html>.
Rusling, D. A., Scheduling, [online], [retrieved on Dec. 7, 1999]. Retrieved from the Internet: <URL: cebaf.gov/.about.saw/linux/tlk-html/node47.html>.
Rusling, D. A., Scheduling in Multiprocessor Systems, [online], [retrieved on Dec. 7, 1999]. Retrieved from the Internet: <URL:cebaf.gov/.about.saw/linux/tlk-html/node48.html>.
Rusling, D. A., Files, [online], [retrieved on Dec. 7, 1999]. Retrieved from the Internet: <URL: cebaf.gov/.about.saw/linux-html/node49.html>.
Goyal, P. et al., "Start-time Fair Queuing: A Scheduling Algorithm for Integrated Services Packet Switching Networks," Proceedings of ACM SIGCOMM '96, San Francisco, CA, Aug. 1996, 14 pages.
Janosi, T., "Notes on 'A Hierarchical CPU Scheduler for Multimedia Operating Systems' by Pawan Goyal, Xingang Guo and Harrick Vin," [online], [retrieved on May 8, 2000]. Retrieved from the Internet: <URL:http://cs.cornell.edu/Info/Courses/Spring-97/CS614/goy.html>.
Goyal, P., "Packet Scheduling Algorithms for Integrated Services Networks," PhD Dissertation, University of Texas, Austin, TX, Aug. 1997.
Boehm, B., "Managing Software Productivity and Reuse," IEEE Computer, vol. 32, No. 9, Sep. 1999, 3 pages.
Corbato, F. J. et al. "An Experimental Timesharing System," Proceedings of the American Federation of Information Processing Societies Spring Joint Computer Conference, San Francisco, CA, May 1-3, 1962, pp. 335-344.
Deutsch, P. and Grant, C.A., "A Flexible Measurement Tool for Software Systems," Information Processing 71 (Proc. of the IFIP Congress), 1971, pp. 320-326.
Edjlali, G., et al., "History-based Access Control for Mobile Code," Fifth ACM Conference on Computer and Communication Security, Nov. 3-5, 1998, 19 pages.
Erlingsson, U. and Schneider, F. B., "Sasi Enforcement of Security Policies: A Retrospective," Proc. New Security Paradigms Workshop, Apr. 2, 1999, pp. 1-17.
Erlingsson, U. and Schnieder, F. B., IRM Enforcement of Java Stack Inspection, [online], Feb. 19, 2000 [Retrieved on Apr. 2, 2002]. Retrieved from the Internet: <URL: http://cs-tr.cs.cornell.edu/Dienst/UI2.0/ShowPage/ncstrl.cornell/TR2000-1786>.
Evans, D. and Twyman, A., "Flexible Policy-Directed Code Safety," Proc. of 1999 IEEE Symposium on Security and Privacy, Oakland, CA, May 9-12, 1999, pp. 1-14.
Fraser, T. et al., "Hardening COTS Software with Generic Software Wrappers," Proc. of 1999 IEEE Symposium on Security and Privacy, 1999, 15 pages.
Goldberg, I. et al., "A Secure Environment for Untrusted Helper Applications (Confining the Wily Hacker)," Proc. of the Sixth USENIX UNIX Security Symposium, San Jose, CA, Jul. 1996, 14 pages.
Goldberg, R. P., "Survey of Virtual Machine Research," IEEE Computer, Jun. 1974, pp. 34-45.
Pandey, R. And Hashii, B., "Providing Fine-Grained Access Control for Mobile Programs Through Binary Editing," Technical Report TR98 08, University of California, Davis, CA, 1998, pp. 1-22.
Ritchie, D. M., "The Evolution of the Unix Time-Sharing System," AT&T Bell Laboratories Technical Journal 63, No. 6, Part 2, Oct. 1984, (originally presented 1979), 11 pages.
Saltzer, J., H. and Schroeder, M. D., The Protection of Information in Computer Systems, [online], 1973, [retrieved on Apr. 2, 2002]. Retrieved from the Internet: <URL: cs.virginia.edu.about.evans/cs551/saltzer/>.
Wahbe, R., et al., "Efficient Software-Based Fault Isolation," Proc. of the Symposium on Operating System Principles, 1993, 14 pages.
Goyal, Pawan et al., Generalized Guaranteed Rate Scheduling Algorithms: A Framework, IEEE/ACM Transactions, vol. 5, Issue: 4, Aug. 1997; pp. 561-571.
Mitra, Debasis et al., "Hierarchical Virtual Partitioning: Algorithms for Virtual Private Networking," Bell Labs Technical Journal, Spring, 1997, http://cm.bell-labs.com/cm/ms/who/mitra/papers/globe.ps.
Plummer, D. C., *An Ethernet Address Resolution Protocol—or—Converting Network Protocol Addresses to 48.bit Ethernet Address for Transmission of Ethernet Hardware,* Nov. 1982, [online], [retrieved on Jan. 17, 2000]. Retrieved from the Internet: <URL: msg.net/kadow/answers/extras/rfc/rfc826.txt>.
Symbol Table, [online] copyright 1997, 1998, [Retrieved on Apr. 4, 2003] Retrieved from the internet <URL: http://216.239.33.100/search?q=cache:eASXk8qC__-AC:www.caldera.com/developers/gabi*1998-04-29/ch4.s...], pp. 1-5.
Rusling, D. A., Processes, [online], [retrieved on Dec. 7, 1999], Retrieved from the Internet: <URL: cebaf.gov/~saw/linux/tlk-html/node44.html>.
Rusling, D. A., Linux Processes, [online], [retrieved on Dec. 7, 1999], Retrieved from the Internet: <URL:cebaf.gov/~saw/linux/tlk-html/node45.html>.
Rusling, D. A., Identifiers, [online], [retrieved on Dec. 7, 1999]. Retrieved from the Internet: <URL:cebaf.gov/~saw/linux/tlk-html/node46.html>.
Rusling, D. A., Scheduling, [online], [retrieved on Dec. 7, 1999]. Retrieved from the Internet: <URL: cebaf.gov/~saw/linux/tlk-html/node47.html>.
Rusling, D. A., Scheduling in Multiprocessor Systems, [online], [retrieved on Dec. 7, 1999]. Retrieved from the Internet: <URL:cebaf.gov/~saw/linux/tlk-html/node48.html>.
Rusling, D. A., Files, [online], [retrieved on Dec. 7, 1999]. Retrieved from the Internet: <URL:cebaf.gov/~saw/linux/tlk-html/node49.html>.
Pending United States patent application entitled "Providing Quality of Service Guarantees to Virtual Hosts," U.S. Appl. No. 09/452,286, filed Nov. 30, 1999.
Pending United States patent application entitled "Selective Interception of System Calls," U.S. Appl. No. 09/499,098, filed Feb. 4, 2000.
Pending United States patent application entitled "Dynamic Scheduling of Task Streams in a Multiple-Resource System to Ensure Task Stream Quality of Service," U.S. Appl. No. 09/498,450, filed Feb. 4, 2000.
Pending United States patent application entitled "Disambiguating File Descriptors," U.S. Appl. No. 09/500,212, filed Feb. 8, 2000.

Pending United States patent application entitled "Restricting Communication Between Network Devices on a Common Network," U.S. Appl. No. 09/502,155, filed Feb. 11, 2000.
Pending United States patent application entitled "Restricting Communication of Selected Processes to a Set of Specific Network Addresses," U.S. Appl. No. 09/503,975, filed Feb. 14, 2000.
Pending United States patent application entitled "Enabling a Service Provider to Provide Intranet Services," U.S. Appl. No. 09/526,980, filed Mar. 15, 2000.

* cited by examiner

DYNAMICALLY MODIFYING THE RESOURCES OF A VIRTUAL SERVER

Matter enclosed in heavy brackets [ ] appears in the original patent but forms no part of this reissue specification; matter printed in italics indicates the additions made by reissue.

CROSS REFERENCE TO RELATED APPLICATIONS

This application is related to U.S. patent Ser. No. 09/499,098, entitled "Selective Interception of System Calls," by Borislav D. Deianov et al., filed Feb. 4, 2000, now U.S. Pat. No. 6,546,546 and commonly assigned with the present application. The subject matter of this related application is incorporated by reference herein in its entirety.

BACKGROUND

1. Field of Invention

The present invention relates generally to resource allocation for a virtual server, and more particularly, to monitoring and dynamically modifying the resource allocation for a virtual server based upon usage.

2. Background of the Invention

Networked computer resources are growing more popular as the benefits of sharing computing resources become evident. One of the fastest-growing segments of the Internet is the network market. Network systems contain common elements, generally including a dedicated local server to maintain the shared network data, and a communications system for providing data communication services between devices on the network. Data communications services and servers are not easy to configure, manage, and maintain. Thus, there is an incentive for Internet Service Providers (ISPs) to provide such network services and servers, thereby relieving corporations of the burden of providing these services directly.

It is not economically feasible for an ISP to remotely manage servers located on a customer's premises, and support many different customers in this fashion. Rather, an ISP would prefer to offer network services to multiple customers while keeping all of the server host computers within a central location of the ISP for ease of management. Accordingly, ISPs typically dedicate one or more physical host computers as each individual customer's server(s), and maintain each host computer in the centralized facility. This means the ISP will have to own and maintain potentially large numbers of physical host computers, at least one for each customer's server or private network. However, most customers will neither require nor be amenable to paying for the user of an entire host computer. Generally, only a fraction of the processing power, storage, and other resources of a host computer will be required to meet the needs of an individual customer.

Different customers have different virtual server needs. For example, a company A providing large quantities of data and information to its employees and customers will want to ensure that its virtual servers are always available to perform a large number of tasks. Company A may be willing to pay a premium for a guaranteed high quality of service, with high server availability and large amounts of processing power always on-call. By contrast, a small individual B who merely uses his virtual server for back-up file storage space has very different quality of service requirements. Customer B needs (and wishes to pay for) only a limited amount of storage space to be available on an intermittent basis.

When servicing the needs of multiple customers having different needs, it is desirable to provide a virtual server that is dynamic, not static, in its allocation of resources. A customer's virtual server is typically assigned a fixed level of resources, corresponding to either a fixed percentage of the capacity of a particular physical host (for example, the operating system may be instructed to allocate twenty percent of the central processing unit cycles to process A and two percent to process B) or a fixed number of units (for example, the operating system may be instructed to allocate X cycles per second to process A and Y cycles per second to process B). However, customers may be unable to anticipate the exact amount of resources they will require, and a static assignment of a particular resource allocation limit may not allow the virtual server system to adapt to changing customer needs.

Instead of requiring customers to select a static level of resources, a better resource allocation model is structured along the lines of electricity pricing—a customer receives what he needs, and be pays for what he receives. Referring back to a previous example, small customer B may initially request a very low level of resources. However, should his new home business suddenly expand, he may quickly bump up against the limit of the server resources he originally requested. In this case, it would be preferable if customer B's virtual server resources were able to automatically, dynamically adjust to his increased resource needs.

Thus it is desirable to provide a system and method for a virtual server capable of providing quality of service guarantees for a customer, which is also capable of adjusting the quality of service based upon changing customer demand. It is desirable for such a system to dynamically adjust the physical host resources allocated to a virtual server.

SUMMARY OF THE INVENTION

The present invention dynamically adjusts the quality of service guarantees for virtual servers based upon the resource demands experienced by the virtual servers. Virtual servers having individual quality of service guarantees are distributed among a group of physical hosts. Each physical host's resources are allocated among the physical host's resident virtual servers. The resources allocated to a particular virtual server may be dynamically adjusted in response to changing virtual server resource needs.

Occasionally, a physical host executing a virtual server may not have additional resources to allocate to a virtual server requiring increased resources. In this instance, a virtual server hosted by the overloaded physical host is transferred to another physical host with sufficient resources.

In one embodiment, a dynamic resource configuration module monitors resource denials received by virtual servers and determines if a virtual server is overloaded based upon the resource denials. A resource denial may refer to any request by the virtual server that cannot be immediately serviced, such as a denial of a request to create a file or a network packet delay. If the resource denials received by a particular virtual server exceed a pre-specified limit, the virtual server is considered overloaded and a request is made for additional resources.

The resource usage of the physical hosts within the system is monitored. A load-balancing function is performed to select the appropriate physical host when a virtual server transfer becomes necessary. A virtual server is transferred between physical hosts with minimal impact upon the operation of the virtual server.

The features and advantages described in the specification are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Reference will now be made in detail to several embodiments of the present invention, examples of which are illustrated in the accompanying drawings. Wherever practicable, the same reference numbers will be used throughout the drawings to refer to the same or like parts. The term "virtual server" as used herein refers to a virtual server capable of receiving a quality of service guarantee from a physical host. Multiple virtual servers may reside in a single physical host, and different virtual servers on the same physical host may receive different quality of service guarantee.

Figure 1:
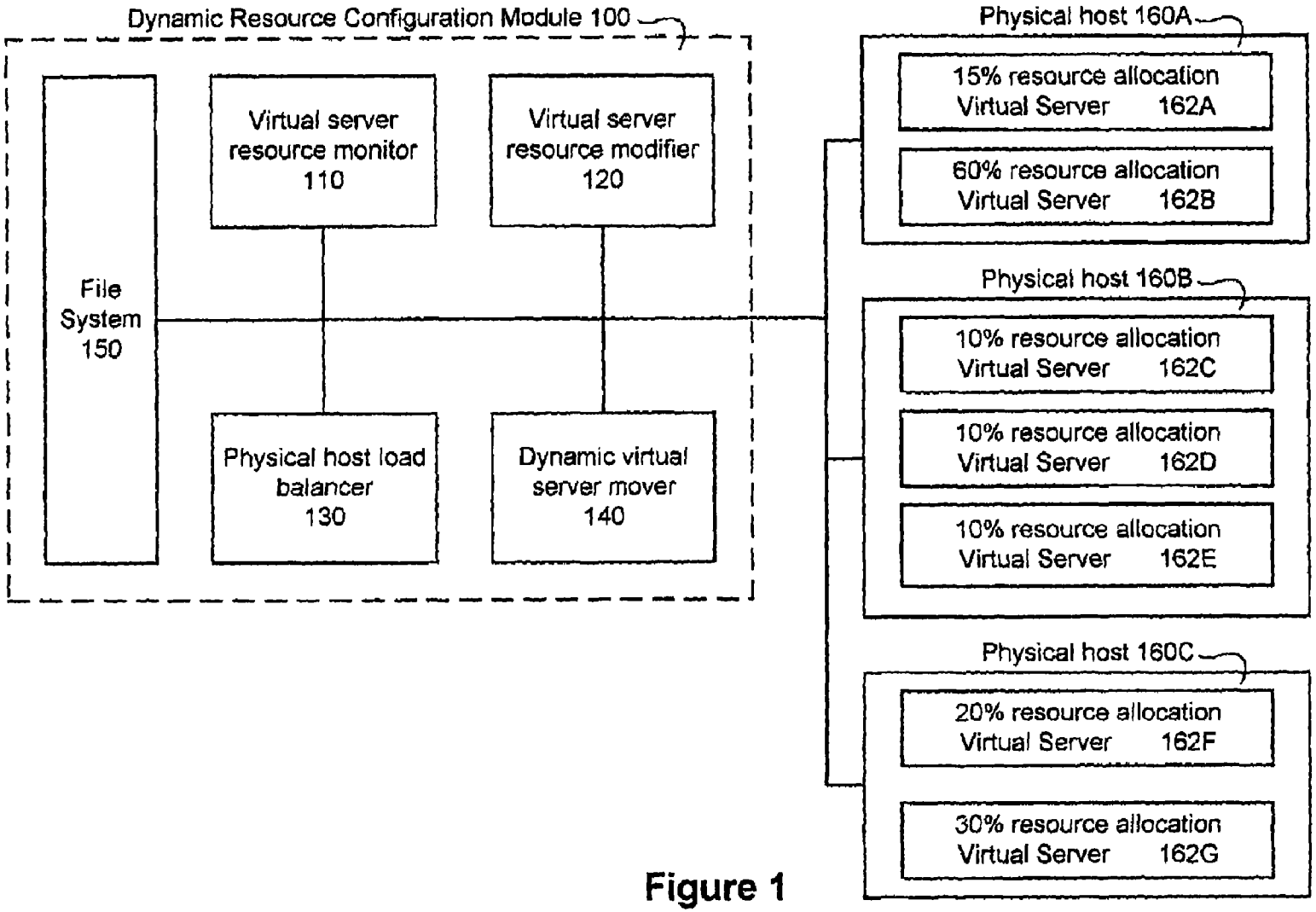
FIG. 1 is an illustration of a system for dynamically modifying the resources of a virtual server.

FIG. 1 shows an embodiment of a system for dynamic resource configuration in virtual servers. A dynamic resource configuration module 100 is coupled via a network to a group of physical host machines 160 (160A, 160B and 160C), or may be resident on any of these hosts 160. The physical host machines 160 may be any kind of computer adapted to support virtual servers. The module 100 may be implemented in a software driver. It is to be understood that the dynamic resource configuration module 100 will typically support more than one physical host machine 160. However, in one embodiment, the dynamic resource configuration module 100 may support a single physical host 160.

The group of physical hosts 160 contains a group of virtual servers 162. Physical host 160A contains virtual servers 162A and 162B; physical host 160B contains virtual servers 162C, 162D and 162E; and physical host 160C contains virtual servers 162F and 162G.

In one embodiment, each individual virtual server 162 has a different quality of service guarantee. Different quality of service guarantees are implemented by allocating different amounts of the resources of each physical host machine 160 to servicing each of the virtual servers 162. Physical host 160 resources may be allocated as percentages of the resources of a particular physical host 160, or as a particular number of units within a physical host 160 (for example, the operating system may be instructed to allocate X cycles per second to process A and Y cycles per second to process B). In the embodiment shown in FIG. 1, physical host 160 resources are allocated to individual virtual servers 162 as percentages of each physical host 160. Table 1 lists the resource allocations of each virtual server 162 as shown in FIG. 1:

TABLE 1

Virtual Server Resource Allocation in FIG. 1

| Virtual Server | Resource Allocation |
|---|---|
| 162A | 15% of physical host 160A |
| 162B | 60% of physical host 160A |
| 162C | 10% of physical host 160B |
| 162D | 10% of physical host 160B |
| 162E | 10% of physical host 160B |
| 162F | 20% of physical host 160C |
| 162G | 30% of physical host 160C |

The virtual servers 162 each may consume a different amount of the resources of the physical host machines 160. The resources of a physical host machine comprise the set of functions and features the physical host machine uses in implementing tasks for each virtual server. Examples of resources include disk space, memory, network capacity and processing cycles (CPU resources). As shown in FIG. 1, virtual server 162A consumes 15% of the physical host 160A resources. This means that 15% of physical host 160A's disk space, memory, network bandwidth, and CPU processing will be dedicated to servicing the needs of virtual server 162A. A variety of other types of physical host resources will be evident to one of skill in the art.

A resource allocation for a virtual server is specified as a "quality of service guarantee" for that particular server. Each physical host stores quality of service guarantees for the virtual servers it hosts. As a physical host performs processes associated with a particular virtual server, the physical host accesses the stored quality of service information to enable the physical host to request the correct quality of service from the operating system kernel of the physical host.

One implementation for storing quality of service guarantee information is a quality of service parameter table. A quality of service parameter table in each physical host 160 associates each virtual server 162 resident in the particular physical host 160 with quality of service parameters. These parameters are used to allocate physical host 160 resources for each resident virtual server 162. For example, physical host 160A includes a quality of service parameter table, which lists resident virtual servers 162A and 162B. The parameter table lists whatever virtual servers are resident in the physical host. As virtual server resource allocations are changed, and as virtual servers are transferred between physical hosts, the corresponding quality of service parameter tables are updated to reflect these changes and transfers. In another embodiment, a single master quality of service parameter table can coordinate multiple slave tables associated with each physical host.

Dynamic resource configuration module 100 includes a virtual server resource monitor 110, a virtual server resource modifier 120, a physical host load balancer 130, a dynamic virtual server mover 140, and a file system 150. In one embodiment, these modules are portions of the software code implementing the dynamic resource configuration module 100. The dynamic resource configuration module 100 is further communicatively coupled to each physical host 160.

The virtual server resource monitor 110 monitors the resource usage of the virtual servers 162 to determine if they are overloaded. The virtual server resource modifier 120 dynamically modifies the resource allocations of the virtual servers 162 on an as-needed basis. The physical host load-balancer 130 periodically monitors the resource usage of the physical hosts 160, and uses the dynamic virtual server mover 140 to transfer virtual servers 162 between physical hosts 160 as needed to balance the loads of the physical hosts 160. The file system 150 is used for storing state information associated with a particular virtual server 162 when transferring the particular virtual server 162 to a different physical host 160. In another embodiment, the file system 150 is not used, and state information is copied directly from one physical host to another physical host to transfer a virtual server.

Figure 2A:
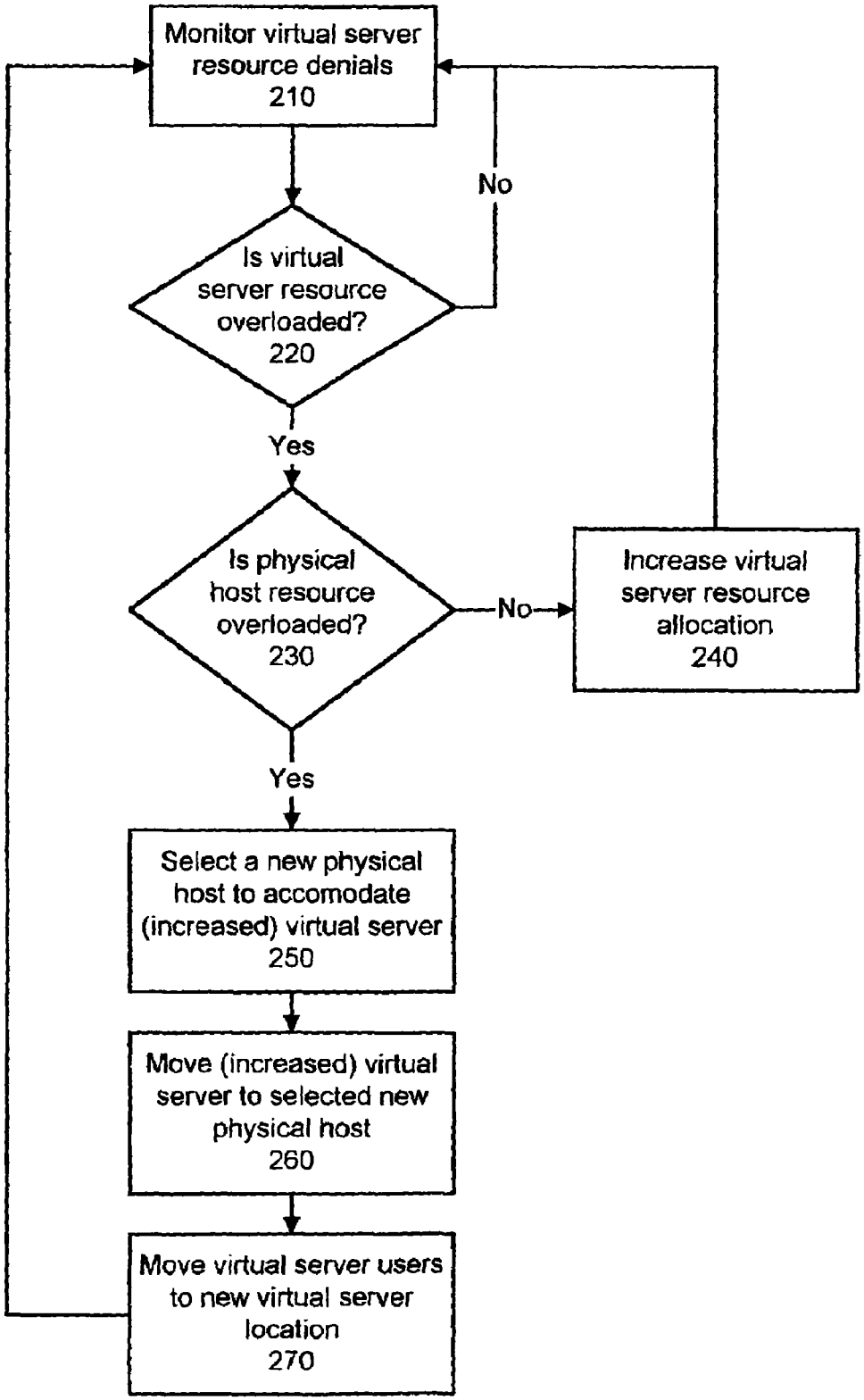
FIG. 2A is a flowchart of a process for dynamically modifying the resources of a virtual server.

FIG. 2A is a flowchart of an embodiment of the overall process for dynamically modifying the resources of a virtual server. Virtual server resource denials are monitored 210. Resource monitoring is performed using the selective interception of system calls. One embodiment of selectively intercepting system calls is disclosed in the related application, the subject matter of which is incorporated herein by reference. Each resource (e.g., disk space, memory, network bandwidth, or CPU cycles) used by a virtual server is monitored to determine the time at which the resource is fully used, that is, the point at which a request for more resources is either implicitly or explicitly denied. Examples of resource denials include a memory allocation request denial and a network packet delay signal.

A determination is made 220 as to whether a particular virtual server resource is overloaded. The number of times a particular resource denial is received in a time window is averaged using one of a number of well-known techniques. If the average number of denials is beyond a pre-configured threshold, the virtual server is determined 220 to be overloaded for the corresponding resource. If the virtual server is not determined to be overloaded, the method continues to monitor 210 virtual server resource denials.

If the virtual server is determined to he overloaded, a determination is made 230 as to whether the corresponding resource of the physical host hosting the virtual server resource is also overloaded. For example, referring to FIG. 1, if it was determined that a resource for virtual server 162B was overloaded, module 100 would then check to see if that same resource was overloaded for physical host 160A which contains virtual server 162B. A physical host 160 resource is determined to be overloaded if the physical host 160 does not have enough of the particular resource unallocated to the resident individual virtual servers 162 to service the resource increase request. The physical host resource is overloaded if: Resource request>Resource available; where Resource available≧0

For example, assume virtual server 162B requests an additional memory allocation of 1 megabyte. If physical host 160A has only 100 kilobytes of memory available (the rest already having been allocated to virtual servers 162A and 162B), then physical host 160A cannot service virtual server 162B's request and physical host 160A is considered overloaded. This same principle may be extended to other types of resources.

If the particular physical host resource is not determined to be overloaded the virtual server resource allocation within the physical host is increased 240. The method then continues to monitor 210 virtual server resource denials.

However, if the physical host is determined to be overloaded, a new physical host is selected 250 to accommodate the overloaded virtual server and its required resource increases. A variety of different fitting heuristic methods may be used to select a new physical host to execute the virtual server. For example, a first fit method may be used, wherein the first physical host 160 determined to have enough extra resources to accommodate the overloaded virtual server 162 is selected. In a best fit method, the physical host 160 with available resources most closely matching the resource needs of the overloaded virtual server 162 is selected. In an easiest fit method, the physical host 160 with the most available resources is selected to accommodate the overloaded virtual server 162. For the following discussion, assume that physical host 160A is overloaded, and new physical host 160B has been selected to receive virtual server 162B.

Once the new physical host 160B has been selected 250, the virtual server 162B is moved 260 to the new physical host 160B. The virtual server 162B is also allocated its required resource increase. In one embodiment, the old overloaded physical host 160A places state information for the virtual server 162B being transferred into a common file system 150, e.g. in a configuration file or other system file. The new physical host 160B accesses the state information and restarts the virtual server 162B as resident in the new physical host 160B. In another embodiment, the virtual server 162B files are copied directly from the old physical host 160A to the new physical host 160B.

Once the virtual server information transfer is complete, the old physical host 160A has one fewer virtual server, and the new physical host 160B has one additional virtual server. The quality of service tables for both the old and new physical hosts are modified 260 to reflect this change. The quality of service table entries for virtual server 162B will also reflect the virtual server's resource increase.

The virtual server user is transferred 270 from the old physical host (160A) to the new physical host (160B) by transferring the virtual server address. The transfer process may use either "break, then make" timing, or "make, then break" timing. The timing of the transfer process determines whether all processes and configuration information associated with the virtual server to he transferred are first shut down in the old physical host, or first started up in the new physical host, before the virtual server address is transferred. Transferring the virtual server address transfers the virtual server user from one virtual server location to another. For example, using "break, then make" timing, the virtual server 162B is first shut down in the old physical host 160A, a new virtual server is created in new physical host 160B and started up, and the virtual server 162B address is then transferred over to the new physical host 160B. In another embodiment using "make, then break" timing, a new virtual server is created in new physical host 160B and started up, the virtual server 162B address is transferred over to the new physical host 160B, and the virtual server 162B is then shut down in old physical host 160A.

As used herein, the terms "customer," "user," and "virtual server user" refer to individuals or groups of individuals accessing the same virtual server. Typically, a virtual server "user" is a group of individuals with a shared association. For example, "user" may collectively refer to the employees of a company, or to certain employees within a division of a company. One company (a "customer") may have several different users, each corresponding to a different group within the company, and each having many different individuals. Additionally, a "user" may also refer to a single individual.

The process for virtual server resource configuration is dynamic and ongoing during the operation of the virtual servers. After the virtual server user transfer 270 is completed, the process continues to monitor 210 virtual server resource denials.

Figure 2B:
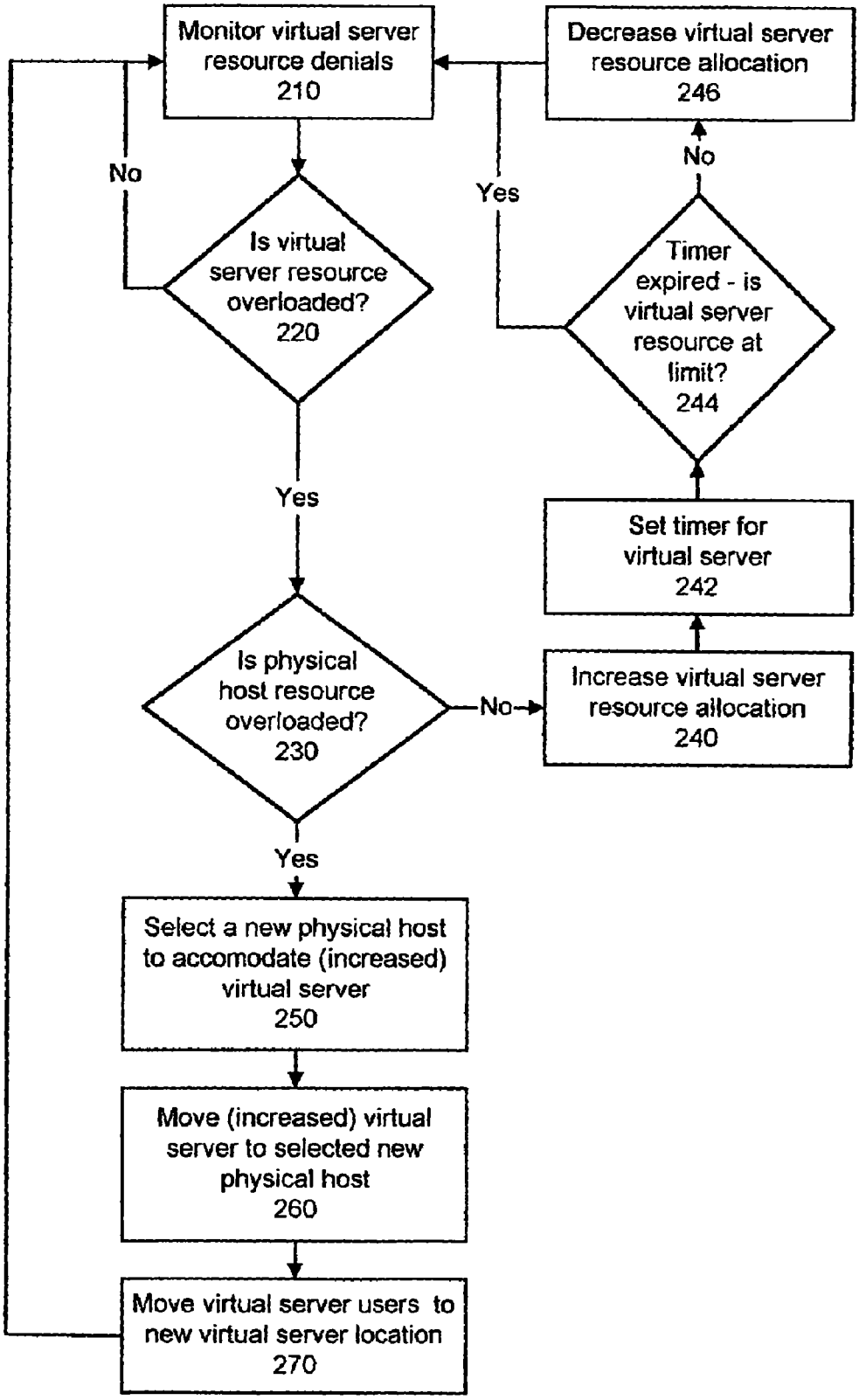
FIG. 2B is a flowchart of another process for dynamically modifying the resources of a virtual server.

FIG. 2B is another embodiment of a flowchart of the process for dynamically modifying the resources of a virtual server. The method shown in FIG. 2B is similar to the method shown in FIG. 2A. However, the method of FIG. 2B includes three additional steps, steps 242, 244 and 246, which together provide a method for reclaiming unused virtual server resources.

As before, virtual server resource denials are monitored 210. If a determination 220 is made that a particular virtual server resource is overloaded, and a determination 230 is made that the corresponding physical host resources are not overloaded, the virtual server resource allocation is increased 240.

Next, a timer is set 242 for a pre-specified interval. Upon timer expiry, the method determines 244 whether the newly increased virtual server resource is currently operating at its resource limit. If one or more resource denial signals corresponding to the newly increased virtual server resource are received during the timer period, the virtual server is assumed to be operating at its resource limit.

If the virtual server is determined 244 to be operating at its limit for a particular resource, the method continues 210 to monitor resource denials. However, if the virtual server is not operating at its limit for a particular resource, the method decreases 246 the virtual server resource allocation by a pre-specified amount. Steps 242, 244, and 246 allow the dynamic resource configuration module 100 to reclaim unused resources within the virtual server system, by temporarily increasing resources allocated to a virtual server as needed.

In another embodiment, a recently transferred virtual server 162 may also allow unused resources to be reclaimed by the virtual server 162's new physical host. In this embodiment, step 270 would be followed by steps 242, 244 and 246.

Figure 3:
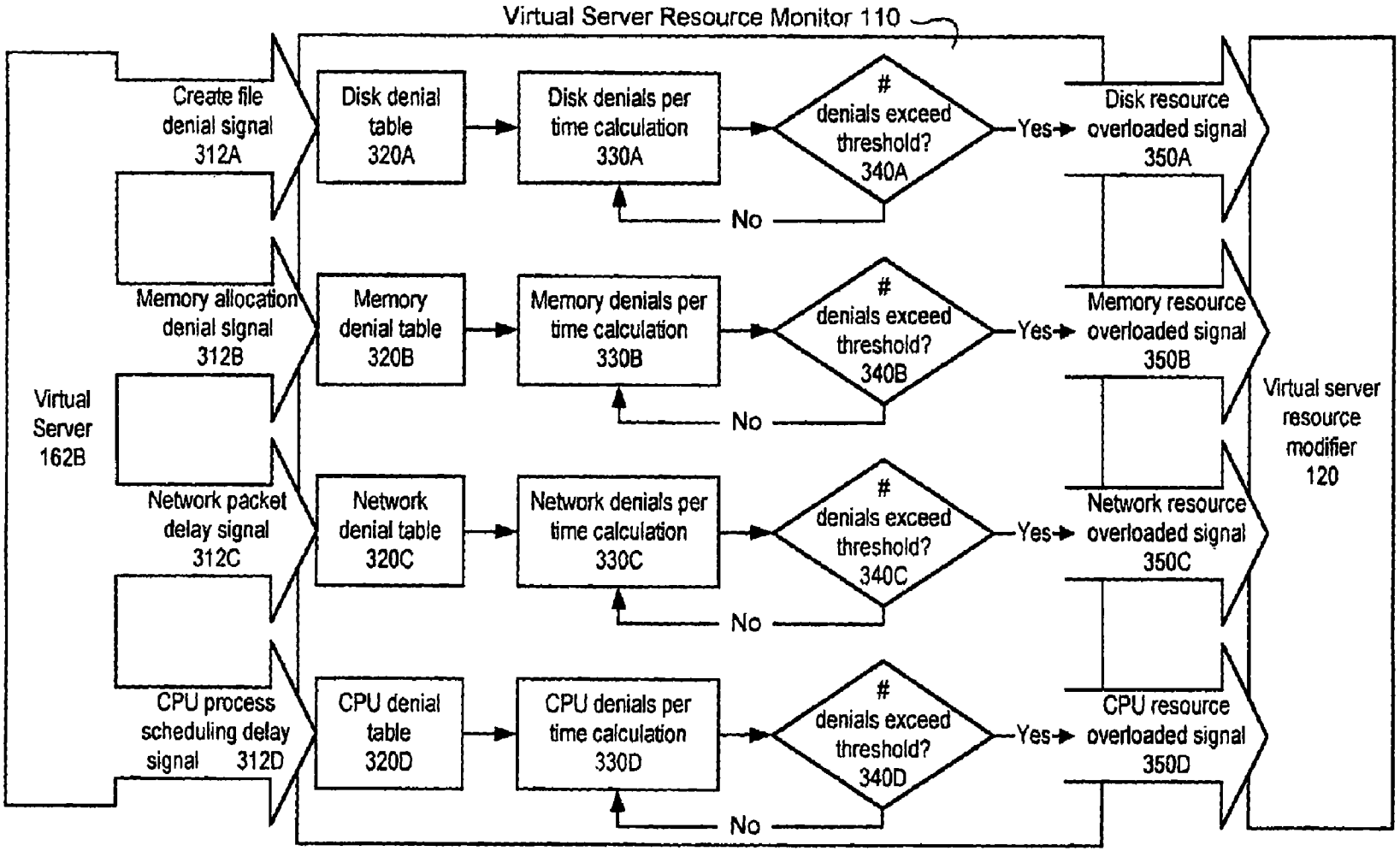
FIG. 3 is a block diagram of a process for determining whether an individual resource in a virtual server has reached its limit.

FIG. 3 shows an embodiment of one process for determining whether an individual resource in a virtual server has reached its resource limit. A virtual server resource monitor 110 receives a set of input signals 312 from a virtual server 162B. The virtual server resource monitor 110 processes these signals to determine if any resources from virtual server 162B are overloaded. If an overloaded resource is found, the virtual server resource monitor 110 sends a "resource overloaded" signal 350 to the virtual server resource modifier 120.

Many different types of input signals 312 may be processed to determine if a resource is overloaded. The virtual server resource monitor 110 monitors different types of resource denials, which are instances wherein a request for additional resources is either implicitly or explicitly denied. FIG. 3 shows four examples of resource denial signals: a create file denial signal 312A generated, for example, by a lack of disk space, a memory allocation denial signal 312B, a network packet delay signal 312C generated by a lack of network bandwidth, and a central processing unit (CPU) process scheduling delay signal 312D generated by exceeding CPU usage limits. It is to be understood that there may be many other types of signals indicating an implicit or explicit denial of resources. The examples shown herein are used purely for illustrative purposes.

In order to associate resource request denials with a particular virtual server executing in a physical host computer, certain selected system calls are intercepted. For example, not all CPU scheduling within the physical host computer is associated with a virtual server. The monitor 110 must be able to distinguish between resource requests made from virtual servers, and other resource requests. The monitor 110 must also be able to distinguish between resource requests made by different virtual servers within the same physical server.

A system call performs some system operation, such as the access of a system hardware or software resource, when the system call is executed. In order to make a system call, arguments are programmatically loaded into specific registers of the central processing unit on which the operating system is executing. One of these arguments identifies the specific system call that is being made. This argument is typically in the form of a number that is an offset into the operating system interrupt vector table, which contains pointers to the actual executable code of the system calls. The other loaded arguments include parameters to be passed to the system call.

Once the arguments have been loaded, a software interrupt is generated, signaling to the operating system that a process is requesting execution of a system call. The operating system reads the registers, and executes the requested system call with the specified parameters. The system call executes and performs the desired functionality. If the system call generates a return value, it places the generated return value (or a pointer thereto) in a pre-designated register where it can be accessed by the calling process.

In order to intercept a system call, a pointer in an interrupt vector table to a system call is replaced with a pointer to alternative object code to be executed instead of the system call. Then, when the system call is made, the alternative object code will execute instead. The alternative object code is known as a system call wrapper.

The method of the related application may be used to selectively intercept system calls such that a system call wrapper only executes when a system call is made by a select process associated with one of the virtual servers being monitored. When a system call is made by a non-select process, the default system call is executed. Furthermore, only certain types of system calls relating to resource allocation, as described above, are selectively intercepted.

The system call wrapper for the intercepted system call allows the resource request by a particular virtual server and the resulting response to be monitored. Request denial responses are monitored by the virtual server resource monitor 110. As will be evident to one of skill in the art, the specific system calls to be monitored will be system-dependent, and may vary based upon the type of operating system and physical server machine being used.

Each resource denial signal 312 is input into an individual resource denial table 320 for tracking purposes. Create file denial signals 312A are recorded in a disk denial table 320A; memory allocation denial signals 312B are recorded in a memory denial table 320B; network packet delay signals 312C are recorded in a network denial table 320C; and CPU process scheduling delay signals 312D are recorded in a CPU denial table 320D. A calculation 330 is performed on the signals stored in each table to determine the mean number of times a particular resource denial occurs in a pre-specified time window. Different time windows may be specified for each type of resource denial. The calculation of mean resource denials is performed individually for each different type of resource denial being monitored (330A, 330B, 330C and 330D).

The mean number of resource denials may be calculated using one of several well-known techniques for averaging a signal rate over a period of time. Each technique determines whether the number of received resource denial signals a received in a particular time window t exceeds a certain threshold T:

$$a(t)>T?$$

In one embodiment, a "jumping-window" technique is used. The jumping-window technique measures the number of resource denials a received in consecutive windows of time length t. A new time interval t starts immediately after the end of the last time interval t. In another embodiment, a "moving-window" technique is used. The moving-window technique measures the number of resource denials a received in a continuously moving window of time length t. In the moving-windows technique, all windows of time length t are measured.

The virtual server resource monitor 110 checks 340 if the metric a(t) calculated is beyond the pre-specified threshold T. This determination is made individually for each type of resource denial signal (340A, 340B, 340C and 340D), and need not be made simultaneously. Each different type of resource denial signal 312 may have a different pre-specified threshold T.

If the metric a(t) representing the average resource denial rate does not exceed the threshold T, the method continues to calculate a(t) 330 so that resource denials are continuously monitored. Using the jumping-window technique, after the next consecutive time interval t passes, the method will again check 340 if a(t)>T. Using the moving-windows technique, a continuous loop of steps 330 and 340 is used to measure each continuously-moving window of time t. In another embodiment, a pre-specified schedule for repeating calculating mean resource denials 330 and checking 340 if the threshold T has been exceeded can be established to limit the amount of processing required by the virtual server resource monitor 110.

However, if the metric a(t) does exceed the threshold T, a "resource overloaded" signal is sent 350 to the virtual server resource modifier 120. Each type of resource denial signal 312 has an associated resource overloaded signal. FIG. 3 shows four examples of resource overloaded signals: disk resource overloaded signal 350A, memory resource overloaded signal 350B, network resource overloaded signal 350C, and CPU resource overloaded signal 350D. It is to be understood that there may be many other types of signals indicating an overloaded resource. The examples shown herein are used purely for illustrative purposes.

Figure 4:
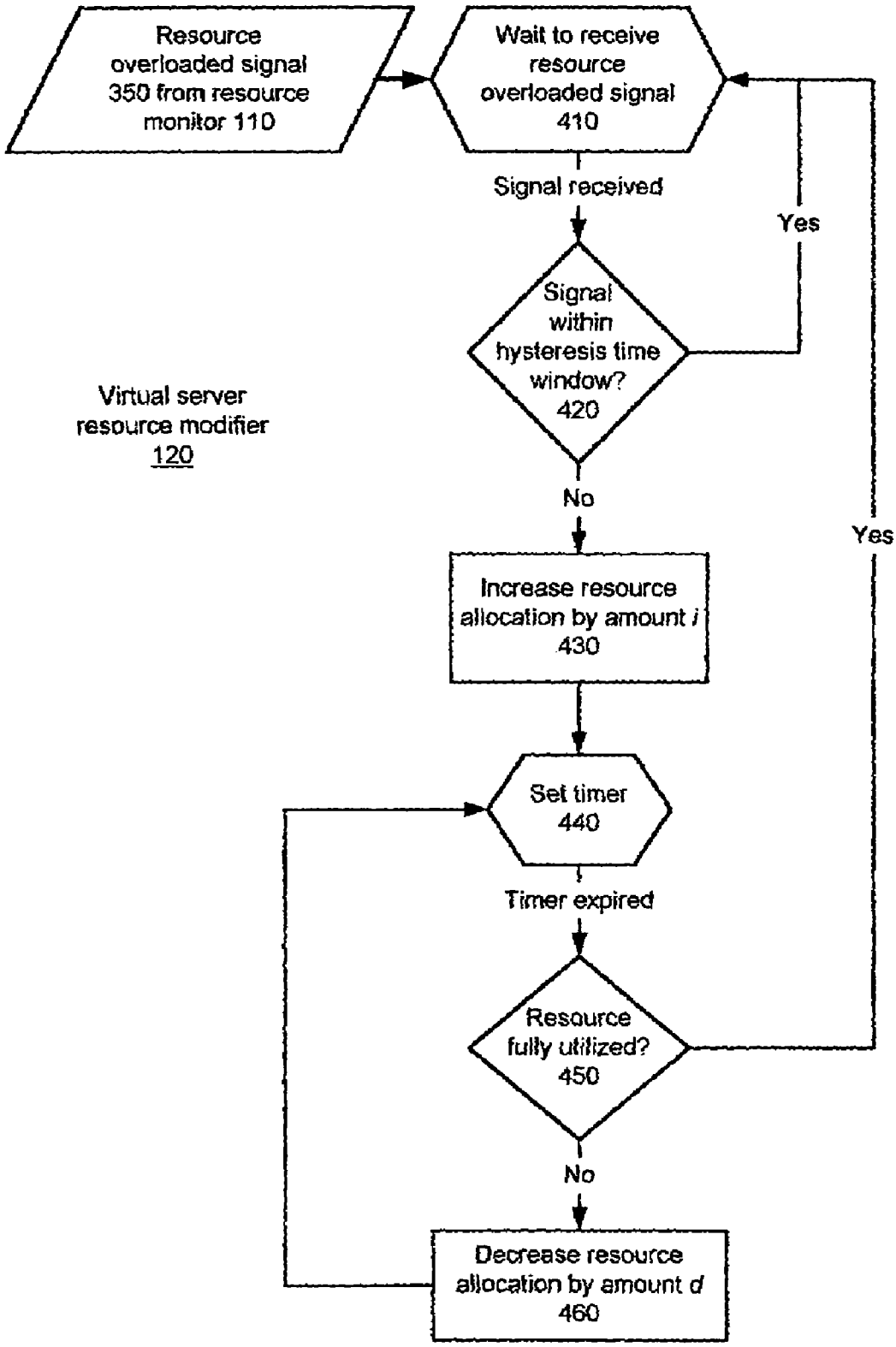
FIG. 4 is a flowchart of a process for determining when to increase or decrease a virtual server resource allocation.

FIG. 4 shows a flowchart of an embodiment of a method for determining when to increase or decrease a particular resource allocation within a virtual server. The virtual server resource modifier 120 performs the method shown in FIG. 4. A separate analysis using the method of FIG. 4 is performed for each type of resource being monitored.

The modifier 120 waits 410 to receive a resource overloaded signal 350 from the virtual server resource monitor 110. When a resource overloaded signal 350 is received, the modifier 120 checks 420 to determine whether the signal 350 falls within a pre-specified "hysteresis time window" H. The hysteresis time window H check 420 damps the modifier 120 system to avoid rapid changes in the system state. For example, in a situation in which a virtual server has overloaded its existing memory resource allocation, the virtual server may attempt to access memory repeatedly before the memory resource allocation is increased. Each memory access attempt may generate a memory resource overloaded signal 350B. The modifier 120 only needs to respond to one of these signals. The hysteresis time window H check 420 avoids repetitive responses to resource overloaded messages. Thus, the modifier 120 checks 420 whether the most recently received resource overloaded signal 350 (received at $T_1$) is close in time (within the hysteresis time window H) to a previously received resource overloaded signal 350 (received at $T_0$) for a particular resource:

$$T_1-T_0<H?$$

If the recent and previous resource overloaded signals have occurred close enough in time to fall within the pre-specified hysteresis time window H, no further action will be taken and the modifier 120 returns and waits 410 to receive another resource overloaded signal 350. If the current resource overloaded message is not received within the hysteresis time window H, the modifier 120 proceeds to increase 430 the virtual server resource allocation.

The resource allocation for a particular overloaded resource is increased 430 by a pre-specified amount i. Amount i may be specified as a certain percentage of the resources of a physical host, or alternatively amount i may be specified as a certain number of resource units. Amount i may also be specified as a certain percentage of each particular virtual server's current resource allocation, e.g. increase a resource by 5% of its current value. After a particular resource has been increased the modifier 120 sets 440 a timer for a pre-specified time period.

When the timer expires, the modifier 120 determines 450 if the recently increased resource is being fully utilized. In one embodiment, a resource is fully utilized if a corresponding resource denial signal has been received within the timer period 440 after the resource was increased.

If the resource is determined 450 to be fully utilized, the modifier 120 returns and waits 410 for an overloaded signal. However, if it is determined that the resource is not being fully utilized, the modifier 120 decreases 460 the resource by a pre-specified amount d. Amount d may be specified as a certain percentage of the resources of a physical host, or amount d may be specified as a certain number of resource units. Amount d may also be specified as a certain percentage of each particular virtual server's current resource allocation, e.g. decrease a resource by 10% of its current value.

In one embodiment, d (the resource decreases amount) is larger than i (the resource increase amount). This allows unused resources to be decreased aggressively, but overloaded resources to be increased cautiously. In another embodiment, d and i are set such that the resource allocation is increased and decreased by equal amounts. For example, assume that the increase in virtual server resources i is specified as a percentage of each virtual server's current resource allocation. The decrease in virtual server resources d is specified as $d=1-(1/1+i)$, which returns the resource allocation to its previous level. Once the resource reaches a fully utilized state, the modifier 120 then returns to waiting 410.

Figure 5:
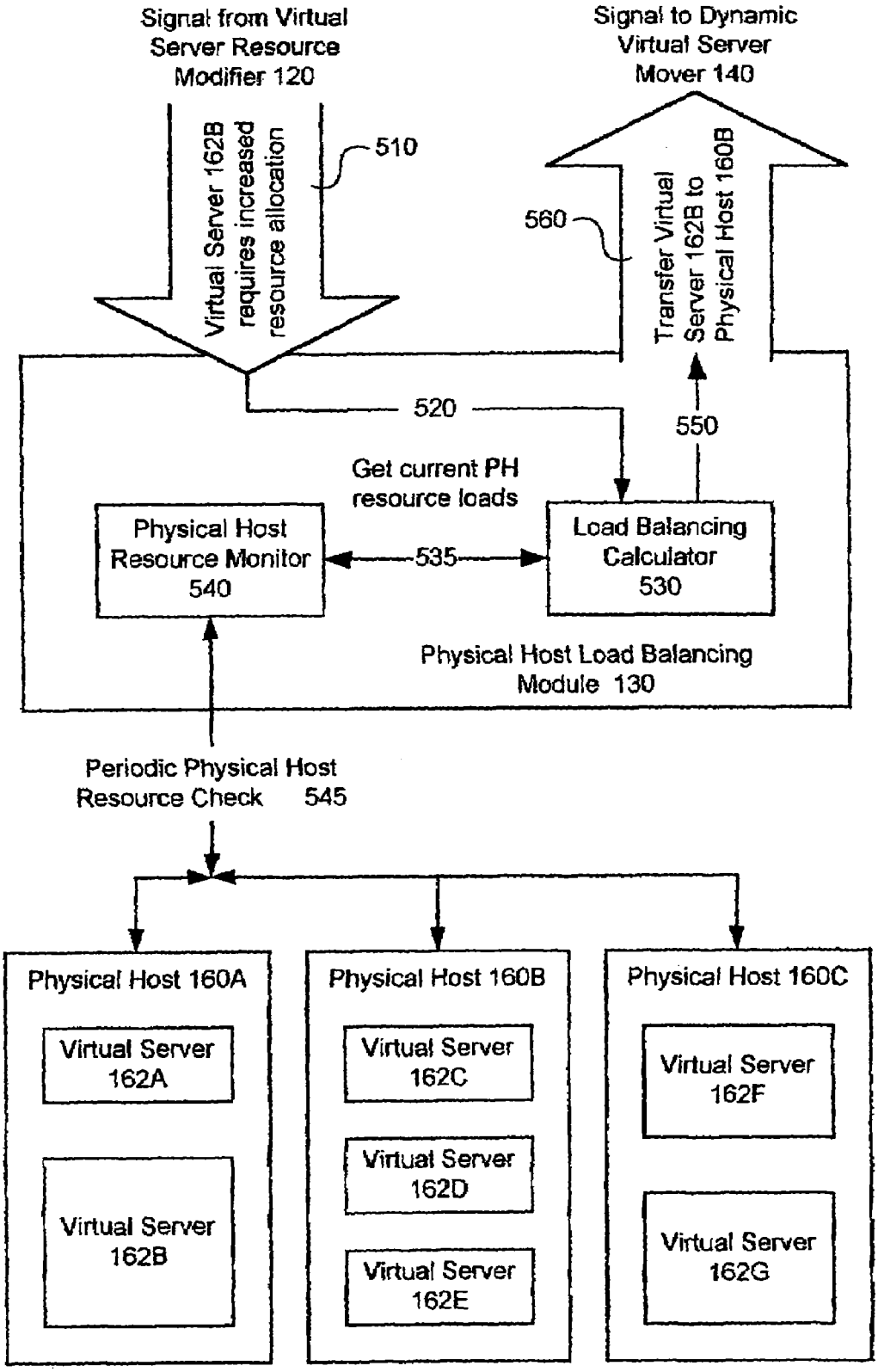
FIG. 5 is a block diagram of one process for performing resource load balancing among physical hosts.

FIG. 5 shows a block diagram of an embodiment of a process for performing resource load balancing among physical hosts, in the context of a working example of overloaded physical host 160A. The physical host load balancer 130 periodically monitors the resource usage of a group of physical hosts 160 (160A, 160B and 160C) and transfers virtual servers to different ones of these physical hosts 160 in order to balance the resource loads between the physical hosts 160. Requests to increase virtual server resource allocations are also sent to the physical host load balancer 130 in order to assist in the balancing of physical host 160 resource loads. This process is next explained by example.

In this example, physical host load balancing module 130 receives a signal 510 from the virtual server resource modifier 120 indicating that virtual server 162B requires an increased resource allocation. This signal is used as an input 520 into the load-balancing calculator 530. The load-balancing calculator 530 also requests and receives as input the current physical host resource loads 535 from the physical host resource monitor 540.

The physical host resource monitor 540 performs periodic physical host resource checks 545 upon the group of physical hosts 160 (160A, 160B and 160C). Resource checks 545 monitor the current virtual server resource guarantees in each quality of service table for each physical host 160.

The load-balancing calculator 530 determines whether a virtual server's request for additional resources 510 will overload the particular physical host currently hosting the virtual server. Using the example shown in FIG. 5, the load-balancing calculator 530 determines whether physical host 160A is capable of supporting the request for additional virtual server 162B resources 510. If the resource request 510 exceeds the available resources of physical host 160A, the load-balancing calculator 530 determines that physical host 160A is overloaded.

In one embodiment, the load-balancing calculator 530 uses an easiest fit heuristic to find the physical host that has the most available resources. Each different type of resource is associated with an ordinal and a weight. The $i^{th}$ resource $R_i$ has ordinal i and weight $w_i$. For example, resource $R_1$ represents disk resources, $R_2$ represents memory resources, $R_3$ represents network resources and $R_4$ represents CPU resources. The weights for each respective resource are determined by the system operator.

Let $R_i(V)$ denote the resource requirement of the virtual server under consideration, e.g. virtual server 162B, including the requested resource increase from signal 510. Let $R_i(S_j)$ denote the resource availability at the $j^{th}$ physical host. The load-balancing calculator 530 computes the weighted resource availability of physical host j as the sum over i:

$$\sum_i w_i * (R_i(S_j) - R_i(V))$$

Using the easiest fit heuristic, the load-balancing calculator 530 will select the physical host with the largest weighted resource availability to receive the virtual server 162B (in the example of FIG. 5, physical host 160B). The choice of physical host 160B is subject to the constraint that the selected physical host 160B has sufficient resources to meet the resource demands of virtual server 162B. The load-balancing calculator 530 sends 550 a signal 560 to the dynamic virtual server mover 140 indicating that virtual server 162B is to be transferred to physical host 160B.

It will be understood by one of skill in the art that load-balancing calculator 530 may use other criteria for selecting which virtual server to transfer out of an overloaded physical host. In the embodiment given above, the load balancing calculator 530 transfers the virtual server that has most recently requested additional resources. However, in another embodiment, the load balancing calculator could select, for example, the smallest virtual server within an overloaded physical host for transfer, regardless of which virtual server has recently made a request for increased resources.

Figure 6:
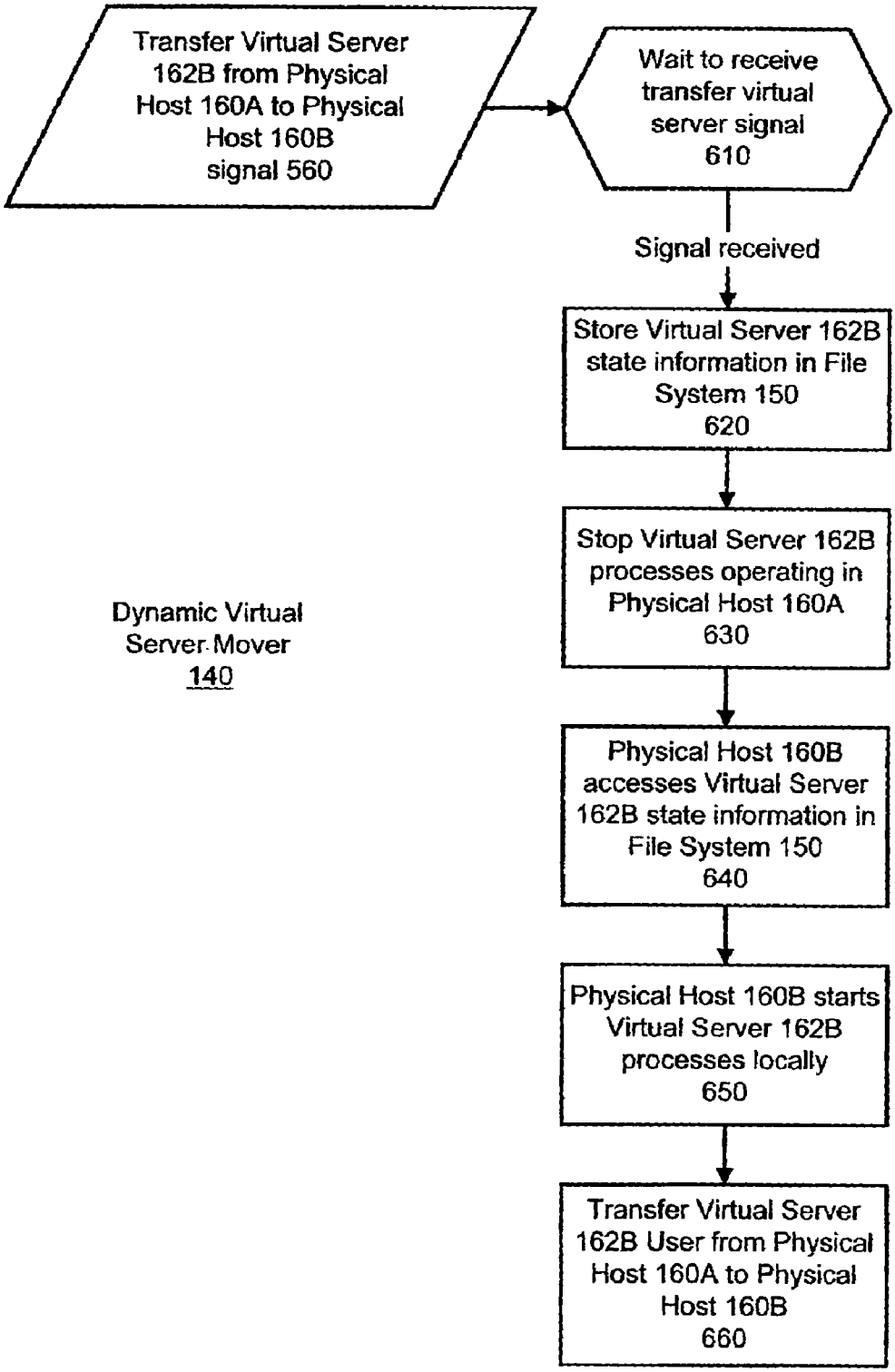
FIG. 6 is a flowchart of one process for transferring a virtual server from one physical host to another physical host.

FIG. 6 is a flowchart of an embodiment of the process for transferring a virtual server from one physical host to another physical host. The dynamic virtual server mover 140 directs the process of FIG. 6. This process is next explained by example.

In this example, virtual server 162B is transferred from old physical host 160A to new physical host 160B. The mover 140 waits 610 to receive a transfer virtual server signal 560. The mover 140 receives a signal 560 directing the transfer of virtual server 162B from physical host 160A to physical host 160B. The mover 140 directs physical host 160A to store 620 local state information associated with virtual server 162B in the file system 150. As shown in FIG. 1, file system 150 is commonly accessible from physical hosts 160A, 160B and 160C.

Mover 140 next directs physical host 160A to stop 630 local processes associated with the virtual server being moved, e.g. virtual server 162B. Mover 140 directs physical host 160B to access 640 the virtual server 162B state information stored in file system 150. Mover 140 directs physical host 160B to start 650 processes associated with virtual server 162B locally. This enables virtual server 162B to begin running locally in physical host 160B. The user of virtual server 162B is then transferred 660 from physical host 160A to physical host 160B by transferring the virtual server 162B address to the new physical host 160B. As explained previously, the mover 140 may use either "make, then break" timing or "break, then make" timing for the transfer process. Although the invention has been described in considerable detail with reference to certain embodiments, other embodiments are possible. As will be understood by those of skill in the art, the invention may be embodied in other specific forms without departing from the essential characteristics thereof. For example, the dynamic resource configuration module may support different numbers of physical hosts. Additionally, different fitting heuristic methods may be used to select physical hosts for receiving transferred virtual servers during load balancing among the physical hosts. Accordingly, the present invention is intended to embrace all such alternatives, modifications, and variations as fall within the spirit and scope of the appended claims and equivalents.

What is claimed is:

1. A network system for dynamically modifying the computer resources allocated to a virtual server, the network system comprising a plurality of physical hosts, the virtual server operating in a first physical host, the computer resources allocated to the virtual server being specified as a quality of service guarantee, the network system comprising:

a virtual server resource monitor communicatively coupled to the first physical host and configured to monitor resource denials and to send a virtual server overloaded signal in response to the resource denials;

a virtual server resource modifier communicatively coupled to the first physical host and configured to receive the virtual server overloaded signal and, in response to the virtual server overloaded signal, to modify a resource allocation for the virtual server and to send a virtual server resource modification signal;

a load balancing module communicatively coupled to the plurality of physical hosts and configured to receive the virtual server resource modification signal and to determine whether the first physical host is overloaded and, in response to a determination that the first physical host is overloaded, to send a physical host transfer signal that indicates a second physical host; and a dynamic virtual server mover communicatively coupled to the plurality of physical hosts and configured to receive the physical host transfer signal and, in response to the physical host transfer signal, to transfer the virtual server from the first physical host to the second physical host.

2. The network system of claim 1, further comprising a file system communicatively coupled to the plurality of physical hosts and configured to store virtual server system files.

3. The network system of claim 2, wherein the dynamic virtual server mover is further configured to direct the first physical host to store, in the file system, a set of system files for the virtual server and to direct the second physical host to access, from the file system, the set of system files for the virtual server, thereby transferring the virtual server from the first physical host to the second physical host.

4. A *computer-readable storage device storing a* computer program [product] to be executed in a computer for dynamically modifying the computer resources allocated to a virtual server operating in a first physical host in a network system, the network system comprising a plurality of physical hosts, the computer resources allocated to the virtual server being specified as a quality of service guarantee, the computer program [product] comprising:

program code for creating a virtual server resource monitor communicatively coupled to the first physical host and configured to monitor resource denials and, in response to the resource denials, to send a virtual server overloaded signal;

program code for creating a virtual server resource modifier communicatively coupled to the first physical host and configured to receive the virtual server overloaded signal and, in response to the virtual server overloaded signal, to modify a resource allocation for the virtual server and to send a virtual server resource modification signal;

program code for creating a load balancing module communicatively coupled to the plurality of physical hosts and configured to receive the virtual server resource modification signal and to determine whether the first physical host is overloaded and, in response to a determination that the first physical host is overloaded, to send a physical host transfer signal that indicates a second physical host; and program code for creating a dynamic virtual server mover communicatively coupled to the plurality of physical hosts and configured to receive the physical host transfer signal and, in response to the physical host transfer signal, to transfer the virtual server from the first physical host to the second physical host.

*5. A system for modifying the computer resources allocated to a virtual server operating in a first physical host of multiple physical hosts, the system comprising:*

*a processor and memory;*

*a virtual server resource monitor configured to monitor resource denials and to send a virtual server overloaded signal in response to the resource denials;*

*a virtual server resource modifier configured to receive the virtual server overloaded signal and, in response to the virtual server overloaded signal, to modify a resource allocation for the virtual server and to send a virtual server resource modification signal;*

*a physical host load balancer configured to receive the virtual server resource modification signal and to determine whether the first physical host is overloaded and, in response to a determination that the first physical host is overloaded, to send a physical host transfer signal that indicates a second physical host; and*

*a dynamic virtual server mover configured to receive the physical host transfer signal and, in response to the physical host transfer signal, to transfer the virtual server from the first physical host to the second physical host.*

*6. The system of claim 5, further comprising a file system configured to store virtual server system files.*

*7. The system of claim 6, wherein the dynamic virtual server mover is further configured to direct the first physical host to store, in the file system, a set of system files for the virtual server and to direct the second physical host to access, from the file system, the set of system files for the virtual server, thereby transferring the virtual server from the first physical host to the second physical host.*

*8. One or more computer-readable storage devices collectively storing computer-executable instructions that, if executed, perform operations for modifying computer resources allocated to a virtual server operating in a first physical host in a system, the system comprising multiple physical hosts, the operations comprising:*

*under control of a virtual server resource monitor,*

*monitoring resource denials; and*

*when a resource denial occurs, sending a virtual server overloaded signal;*

*under control of a virtual server resource modifier,*

*receiving the virtual server overloaded signal;*

*modifying a resource allocation for the virtual server; and*

*sending a virtual server resource modification signal;*

*under control of a load balancer,*

*receiving the virtual server resource modification signal;*

*determining that the first physical host is overloaded; and*

*sending a physical host transfer signal that indicates a second physical host; and*

*under control of a dynamic virtual server mover,*

*receiving the physical host transfer signal; and*

*transferring the virtual server from the first physical host to the second physical host.*

*9. The computer-readable storage device of claim 8 wherein the transferring comprises causing the virtual server to store files in a file system and causing the second physical host to access the files stored in the file system.*

*10. The one or more computer-readable storage devices of claim 8 further comprising, under control of the load balancer, selecting the second physical host based on the resource required by the virtual server.*

*11. The one or more computer-readable storage devices of claim 10 wherein the selecting includes determining which of the multiple physical hosts can provide the resource requested by the virtual server.*

*12. The one or more computer-readable storage devices of claim 10 further comprising moving user information from the first physical host to the second physical host.*

*13. A method performed by a computing system for managing a quality of service for a virtual server, comprising the following computer-implemented instructions:*

*receiving an indication of a quality of service guarantee relating to an amount of a resource allocated to the virtual server, the quality of service specifying an acceptable threshold value for denial of requests for the resource;*

*executing the virtual server at a first physical host;*

*allocating an amount of the resource to the virtual server;*

*causing the virtual server to execute a process;*

*receiving a request for the resource, the request generated by the executing process;*

*when an insufficient amount of the resource is allocated to the virtual server, denying the request for the resource;*

*monitoring a count of resource request denials for the resource;*

*when the count of resource request denials exceeds the threshold value, generating a signal; and*

*in response to the generated signal,*

*increasing the allocated amount of the resource when the resource is available on the first physical host; and*

*transferring the virtual server from the first physical host to a second physical host when the resource is unavailable on the first physical host but is available on the second physical host.*

*14. The method of claim 13 further comprising continuing execution of the process by the transferred virtual server.*

*15. The method of claim 14 further comprising transferring state information for the virtual server from the first physical host to the second physical host.*

*16. The method of claim 15 wherein the transferring comprises:*

*causing the virtual server executing at the first physical host to store state information in a file; and*

*causing the virtual server executing at the second physical host to access state information from the stored file.*

*17. The method of claim 13 further comprising transferring user information from the first physical host to the second physical host.*

*18. The method of claim 13 further comprising:*

*decreasing the allocated amount of the resource when the resource is deallocated.*

*19. The method of claim 13 wherein the increasing comprises determining whether the signal was generated within a hysteresis time window.*

*20. The method of claim 19 wherein the allocated amount of the resource is increased when the signal is generated outside the hysteresis time window.*

*21. The method of claim 20 wherein the allocated amount of the resource is increased by a specified amount.*

*22. The method of claim 13 further comprising transferring the virtual server from the first physical host to the second physical host to balance load between the two physical hosts.*

*23. The method of claim 13 further comprising selecting the second physical host based on the availability of the resource at the second physical host.*

*24. The method of claim 13 further comprising storing the received indication of the quality of service guarantee in a quality of service parameter table that associates each virtual server executing at the physical host with quality of service guarantee provided to that virtual server.*

*25. The method of claim 13 further comprising updating in a quality of service parameter table the stored indication of the quality of service guarantee for the virtual server when transferring the virtual server from the first physical host to the second physical host.*

* * * * *

UNITED STATES PATENT AND TRADEMARK OFFICE

CERTIFICATE OF CORRECTION

PATENT NO. : RE42,726 E
APPLICATION NO. : 11/971778
DATED : September 20, 2011
INVENTOR(S) : Keshav et al.

It is certified that error appears in the above-identified patent and that said Letters Patent is hereby corrected as shown below:

Title Page 3, item (56), under "Other Publications", in Column 1, Line 17, delete "(OSDE'96)," and insert -- (OSDI'96), --.

Title Page 3, item (56), under "Other Publications", in Column 1, Line 43, delete "linux-html" and insert -- linux/tlk-html --.

Title Page 3, item (56), under "Other Publications", in Column 2, Line 35, delete "Transmission of" and insert -- Transmission on --.

Title Page 3, item (56), under "Other Publications", in Column 2, Line 41, delete "gabi*1998" and insert -- gabi/1998 --.

Column 13, line 12, in Claim 4, delete "in a" and insert -- in *a* --.

Column 14, line 36, in Claim 9, delete "*computer-readable storage device*" and insert -- *one or more computer-readable storage devices* --.

Signed and Sealed this
Thirteenth Day of March, 2012

David J. Kappos

David J. Kappos
*Director of the United States Patent and Trademark Office*